(12) United States Patent
Rohs et al.

(10) Patent No.: US 6,416,416 B1
(45) Date of Patent: *Jul. 9, 2002

(54) TORSIONAL VIBRATION DAMPER WITH DRAG ELEMENT

(75) Inventors: Ulrich Rohs; Hans Rohs, both of Düren; Dietmar Heidingsfeld, Aachen, all of (DE)

(73) Assignee: Rohs-Voigt Patentverwertungsgesellschaft mbH, Düren (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,131

(22) Filed: Oct. 28, 1998

(30) Foreign Application Priority Data

Oct. 29, 1997 (DE) .......................................... 197 47 734
Apr. 22, 1998 (DE) .......................................... 198 17 906

(51) Int. Cl.⁷ ................................................. F16D 3/14
(52) U.S. Cl. .................... 464/66; 464/83; 192/214.1
(58) Field of Search .............................. 464/51, 65, 66, 464/68, 83, 89, 92; 192/213.11, 210, 213.4, 213.3, 214, 210.1, 213.12, 213.22, 213.31, 214.1

(56) References Cited

U.S. PATENT DOCUMENTS

| | | | | |
|---|---|---|---|---|
| 4,570,774 A | * | 2/1986 | Loizeau | 192/213.11 |
| 4,825,718 A | * | 5/1989 | Seifert et al. | 464/89 X |
| 5,169,357 A | * | 12/1992 | Graton | 464/68 |
| 5,230,415 A | * | 7/1993 | Ament et al. | 464/68 X |
| 5,370,581 A | * | 12/1994 | Rohrle et al. | 464/68 |
| 5,377,962 A | * | 1/1995 | Ochs et al. | 464/89 X |
| 5,496,216 A | * | 3/1996 | Rohrle et al. | 464/66 |
| 5,503,595 A | * | 4/1996 | Rohrle | 464/66 X |
| 5,687,827 A | | 11/1997 | Rohs | |
| 5,820,466 A | * | 10/1998 | Graton et al. | 464/68 |

FOREIGN PATENT DOCUMENTS

| | | |
|---|---|---|
| DE | 34 36 012 | 4/1986 |
| DE | 35 16 291 | 11/1986 |
| DE | 38 07 113 | 9/1988 |
| DE | 38 06 013 | 9/1989 |
| DE | 41 28 868 A1 | 3/1993 |
| DE | 43 07 133 A1 | 10/1993 |
| DE | 43 41 370 A1 | 6/1994 |
| DE | 196 11 258 A1 | 11/1996 |
| DE | 196 11 258 | 11/1996 |
| EP | 0 718 518 A1 | 2/1998 |

* cited by examiner

Primary Examiner—Greg Binda
(74) Attorney, Agent, or Firm—Henry M. Feiereisen; Ursula B. Day

(57) ABSTRACT

A torsional vibration damper with optimized damping characteristic includes a primary body (1), a secondary body (2), and a drag element which comprises at least one friction element with at least one pressure device, at least one catch and at least one elastic element. The elastic element has an elastomeric (5) in a cavity (8).

22 Claims, 9 Drawing Sheets

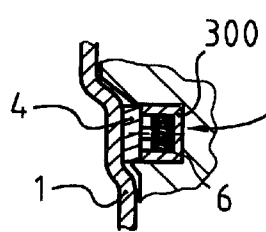
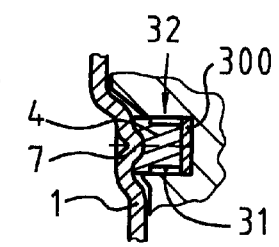
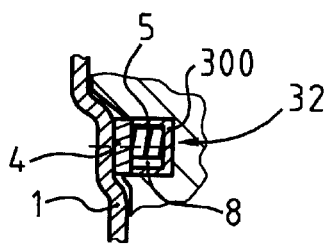
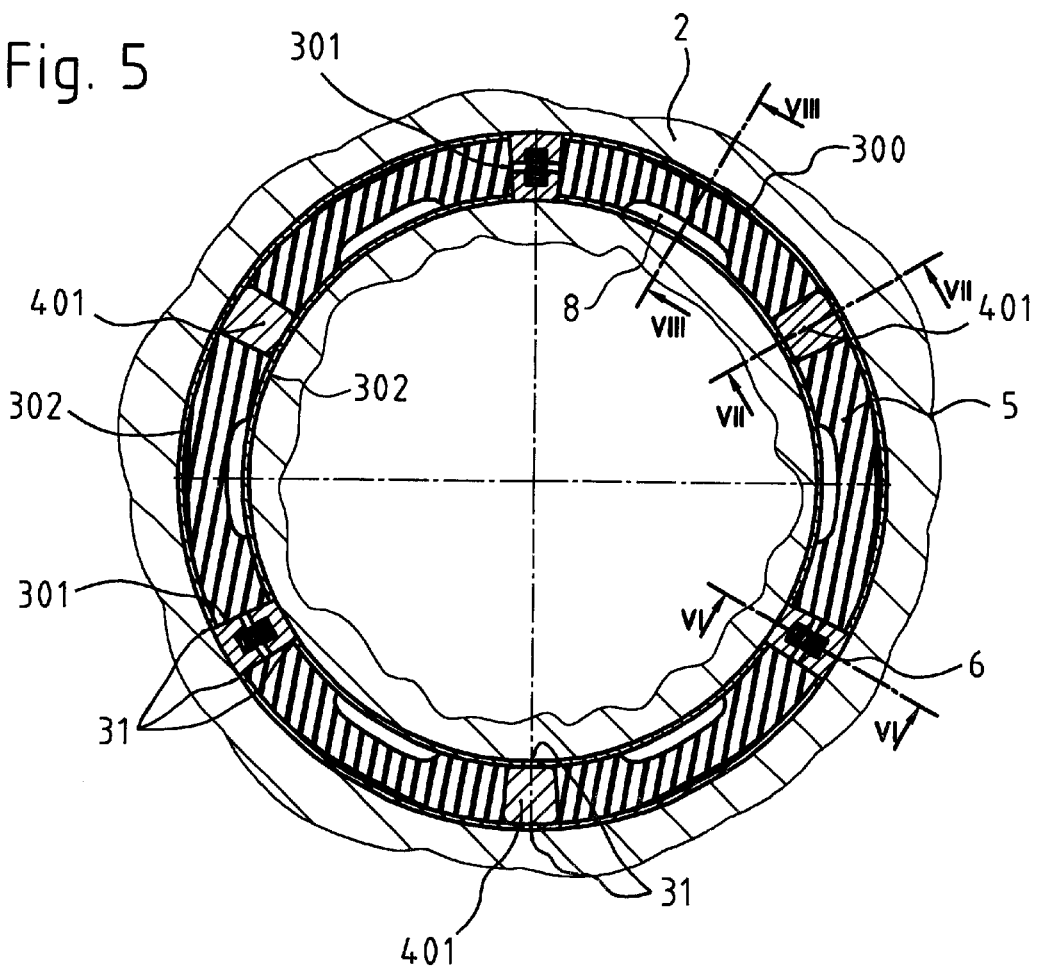

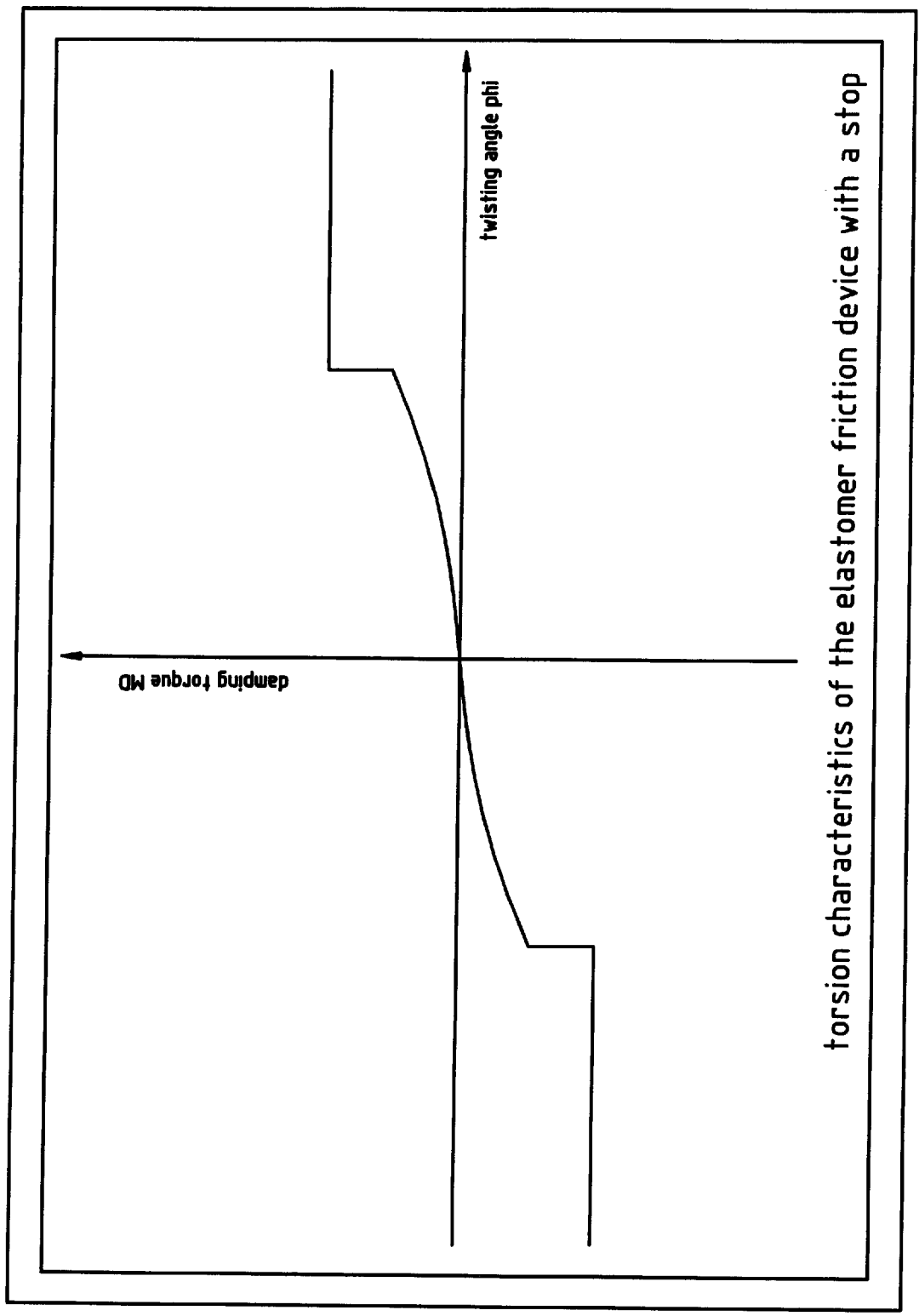

TORSIONAL VIBRATION DAMPER WITH DRAG ELEMENT

CROSS-REFERENCES TO RELATED APPLICATIONS

This application claims the priority of German Patent Applications Serial No.197 47 734.8 filed Oct. 29, 1997 and No.198 17 906.5 filed Apr. 22, 1998, the subject matter of which is incorporated herein by reference.

BACKGROUND OF THE INVENTION

The invention concerns a torsional vibration damper, especially for clutches that consists of a primary body and a secondary body.

Such a torsional vibration damper is e.g. described in EP 0 718 518 A1 which consists of a primary body and secondary body between which is located an arrangement of tangentially-acting spiral springs and tensioning bodies so that the primary body and secondary body can be rotated up to a maximum angle with a torsional characteristic determined by the spring arrangement. The tensioning bodies consist of cylinders and pistons that enclose a cavity which is filled with a cylindrical body of elastoplastic material whose diameter is less than the inner diameter of the cavity and is dimensioned so that it completely fills the cavity after the piston travels an initial, short path. The springs and the tensioning bodies serve as internal dampers to prevent rotary vibrations in the drive train excited by a drive.

DE 41 28 868 A1 describes a torsional vibration damper for similar clutches in which the primary body and the secondary body are only connected by tangentially active spiral springs. A friction ring is provided as the actual damping moment that becomes effective only after a certain angle of rotation is traversed between the primary and secondary bodies.

These prior art systems have the disadvantage that they only encompass part of the working spectrum of a drive but are ineffective in the additional load range. The problem is that the spring force and damping must correspond to the transmitted torque and speed for the load range while only a slight spring force and basically no damping are required to allow the clutch to be disengaged during idling. In the critical speed range, i.e., at speeds within the range the natural frequency, very strong damping is required since the angular acceleration would otherwise be too great in contrast to the primary side. This speed range is passed through primarily when the engine is started and when the load changes. In case of resonance, dynamic moment can arise that is a multiple of the nominal moment.

SUMMARY OF THE INVENTION

It is an object of the invention to present a torsional vibration damper especially for clutches where the damping characteristic can be optimally adapted.

For a solution, the invention suggests a torsional vibration damper consisting of a primary body and secondary body with a drag element that comprises at least one friction element with at least one pressure device, at least one catch and at least one elastic element.

The friction element can either interact with the primary body or the secondary body, and the catch drives the remaining body.

The pressure device is advantageously arranged so that a force acting on the pressure device increases the friction between the friction element and either the primary body or the secondary body. As will be explained in greater detail below, the pressure device can be formed by a friction ring edge or by an expanding ring that is situated in reference to the friction ring, and it interacts with the elastic element so that a force exerted by the elastic element on the pressure device, i.e., on the friction ring edge or the expanding ring increases the friction of the friction element with the primary or secondary body. Hence the friction caused by the friction element depends on the force exerted on the elastic element and hence on the angle of rotation between the primary and secondary bodies.

The arrangement according to the invention allows the damping characteristic to be suitably adapted, especially when large forces are exerted.

The elastic element advantageously has a rubber-like element in a cavity. The damping characteristic of the torsional vibration damper according to the invention can be advantageously influenced under large and small forces or angles of rotation. Under small forces or angles of rotation, the rubber-like element acts like an elastic spring. If the rubber-like element is further compressed until it fills the cavity, the elastic element consisting of the cavity and rubber-like element as if it enclosed a hydraulic liquid. In this state, the elastic element can counter substantially higher forces than prior-art torsional vibration dampers.

Particularly when the elastic element is tangentially compressed by a relative movement between the primary and secondary bodies, it is advantageous when the rubber-like element is without play in a tangential direction in the cavity. The elastic effect of the rubber-like element then begins immediately.

A particularly simple and hence reliable construction arises in this case when the cavity is delimited radially by a pressure device. The tangential compression of the rubber-like element determines its radial and axial expansion. The rubber-like element can act radially on the pressure device and hence increase the friction between the friction element and either the primary or secondary body. If there is also an axially-acting pressure device, it is also correspondingly acted upon by force.

The volume ratio of the cavity to the rubber-like element and their dimensions can adjust the behavior of the drag element depending on the angle of rotation between the primary and secondary bodies. It is possible in particular to select a rubber-like element that radially fills the cavity at a few sites when relaxed. Upon axial compression of the rubber-like element, slight, direct force is transmitted to the radial pressure device. Likewise, the rubber-like element can be axially designed to exert a selected force on an axial pressure device.

Of course the cavity does not have to be fully enclosed. It is sufficient for the elastic element or rubber-like element to be securely held, or for the edge of the cavity to hold the rubber-like element in the cavity so that the elastic element cannot be excessively pressed out of the cavity.

The force on the rubber-like element can result from a reduction in volume of the cavity due to a relative rotational movement between the primary and secondary bodies. In particular, it is advantageous when the reduction in volume is tangential since such a movement corresponds to the relative movement between the primary and secondary bodies, and the force does not have to be diverted. In particular, axial force is avoided between the primary and secondary bodies.

Independent of this, the torsional vibration damper consisting of a primary body and secondary body can include a drag element that has at least one friction element with at least one essentially tangential stop, at least one essentially tangential catch and at least one elastic element that acts tangentially between the stop and catch, whereby the friction element either interacts with the primary or secondary body, and the catch drives the other cited body.

The tangentially-acting arrangement of the elastic element between the stop of the friction element and the catch allow an optimum adaptation of the damping characteristic, i.e., the rotational characteristic caused by the friction element even when the angle of rotation between the primary and secondary bodies is very small. In particular, the noise that arises in clutches upon load changes when idling caused by very small forces can be more effectively avoided in this manner in contrast to prior art clutches.

The pressure device can be designed so that it acts radially. This has the advantage that the force that acts radially on the pressure device is captured by the torsional vibration damper, and no axial force acts on the other components such as the clutch. This advantage can be attained by using a friction element with a friction surface which has a surface component that extends radially outward.

To attain a minimum friction between the friction element and the primary or secondary body even when the pressure device is not acted on by the elastic element, the friction element can be a pretensioned spring. In particular, this increases adaptability in the low load range.

Of course it does not matter in the cited arrangements whether the catch drives the primary or secondary bodies or whether the friction element takes energy from the system by rubbing on the secondary or primary body.

It is preferable for there to be an elastic element on both sides of the catch in a tangential direction, and tangential stops abut the elastic elements or visa versa. The advantages of the present invention can be exploited independent of the rotational direction between the primary and secondary bodies.

The ring element is annular in one simple embodiment and designed as a drag ring. A catch ring can be correspondingly provided that has one or more catches. The catches or catch ring can have holes in which protrusions engage that are on the primary or secondary bodies. This is a simple mechanism to create a drive connection between the catches or catch ring and the corresponding body. Of course, other connections can be provided between the catches and corresponding primary or secondary bodies for a drive connection. In particular, the catch or catch ring can be provided with projections that engage in the recesses of the corresponding body.

In particular, when a drag ring is used as the drag element, it is advantageous to use a friction ring as the friction element. As stated above, the axial force can be reduced that acts on the other components (such as the clutch) by a friction surface with radially-projecting surface components. Such surfaces can e.g. be realized by a friction ring with an essentially L-shaped cross-section with a leg facing radially outward, or by a friction ring with an essentially U-shaped cross-section that is open in an axial direction. This friction ring should rotate in a corresponding recess, e.g. a U-shaped groove and rub against the corresponding body.

When a friction ring with an essentially L-shaped cross section is used, the processed surface in the corresponding body can be minimized, and one only has to correspondingly process the area of the body that contacts the friction surface, while the rest can remain an unprocessed cast part.

To make it easier to radially displace the radial friction surfaces by the force exerted on the pressure device, at least one axial slot can be provided in the corresponding surface.

The friction ring can be used to form the cavity for the rubber-elastic element, e.g., when it has a U-shaped cross-section and its open side is suitably closed e.g. by the catch ring. This makes it rather difficult to process the friction ring, however, and a suitable cavity is very difficult to realize when an L-shaped friction ring is used. In addition to the friction ring, the friction element can comprise an expanding ring that has at least one stop and is essentially U-shaped and open in an axial direction. The expanding ring is covered by the catch ring to form the essentially sealed cavity. The expanding ring is placed on the friction ring so that when the expanding ring expands or is displaced, the friction of the friction ring on the primary or secondary body is increased. Such an expanding ring makes it easy to use an L-shaped friction ring.

When an expanding ring is used, the torsional vibration damper can be easily pretensioned by cutting the expanding ring at one place and inserting a tangentially-acting pretension spring in the cut. If this expanding ring is inserted in the corresponding friction ring, the tangentially-acting pretension spring radially expands the expanding ring, i.e., radially enlarges the expanding ring diameter. This brings about pretension that is evenly distributed over the perimeter of the friction ring.

The torsional vibration damper can have an additional catch that interacts with a stop upon a certain angle of rotation. The characteristic of the drag element can hence be adapted to a large range of specific requirements. In particular, it is possible to design the catch and the stop so that they are basically rigid in relation to each other. With this arrangement, the drag element is entrained by the additional catches starting at a specific angle of rotation so that the elastic element is no longer compressed. With such an arrangement, the characteristic of the drag element remains constant starting at a specific angle of rotation.

Depending on the requirements, the additional catch and the stop can be elastic in relation to each other. With this arrangement, it is advantageous when an elastic element is between the additional catch and the stop. In this manner, the characteristic of the drag element is determined by two elastic elements starting at a specific angle of rotation.

Of course, the presence of an elastic element between a catch on one of the bodies and a stop of a drag element can be advantageously used independent of the other features of the torsional vibration damper. The same holds true for the presence of another catch that interacts with a stop upon a certain angle of rotation. The latter arrangement can ensure that the drag element is suddenly entrained starting at a specific angle of rotation with the catch and hence with one of the two bodies.

The present invention can be advantageously used especially for torsional vibration dampers where the primary and secondary bodies can only be rotated against each other by a specific angle of rotation due to the dimensions of the torsional vibration damper. Such dimensions can e.g. be realized when the primary and secondary bodies engage with a certain amount of play, or when there are wedges that prevent turning after a certain angle of rotation.

BRIEF DESCRIPTION OF THE DRAWINGS

Other features, advantages and embodiments of a torsional vibration damper according to the invention are presented in the following description and drawing, in which:

FIG. 5 is a second embodiment of a torsional vibration damper according to the invention with a similar section as in FIG. 1;

FIG. 6 is a section of the torsional vibration damper from FIG. 5 along line VI—VI;

FIG. 7 is a section of the torsional vibration damper from FIG. 5 along line VII—VII, FIG. 8 is a section of the torsional vibration damper from FIG. 5 along line VIII—VIII, FIG. 9 are exemplary schematic damping characteristics of the torsional vibration damper of FIG. 5;

FIG. 11 is a schematic, exemplary damping characteristic of the torsional vibration damper from FIG. 10.

DETAILED DESCRIPTION OF THE PREFERRED EMBODIMENTS

Figure 1:
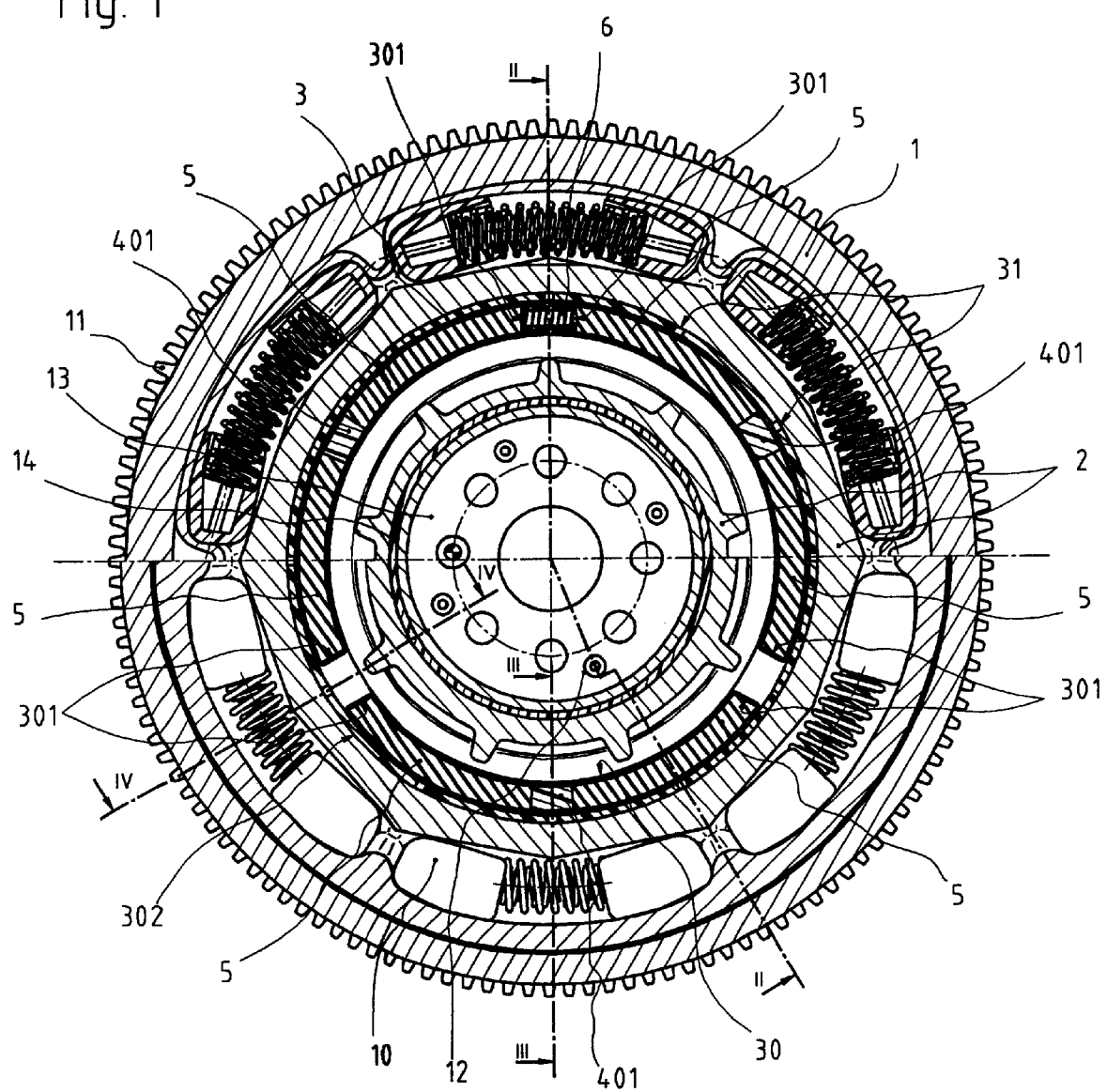
FIG. 1 is a section along line I—I in FIG. 2 of a first embodiment of a torsional vibration damper according to the invention.

A first embodiment of the torsional vibration damper comprises a primary body 1 with a starter ring gear 11 and a secondary body 2, that is rotatably mounted to the primary body 1 via a bearing half shell 14 and a central flange 13 (fixed to primary body 1 by tubular rivets 12). In the present description, axial means a direction perpendicular to the plane of the drawing in FIG. 1, and radial means a direction away from or toward the rotary axis of the torsional vibration damper, and tangential means perpendicular to a radial direction and each axial direction.

The torsional vibration damper also comprises a transmitting plate 15 and several pressure springs 10 between wedges of which only a few are numbered as examples.

An L-shaped friction ring 3 that is formed with axial slots 31 sits in the secondary body 2 (only a few examples are numbered) and a friction ring edge 302, acting as a pressure device, and that is essentially axial, rubs against the secondary body 2. The essentially radial part of the L-shaped friction ring 3 also lies on the secondary body. The friction ring rotates under friction in a correspondingly shaped recess of either the primary body or the secondary body.

An expanding ring 30 with a U-shaped cross-section in the friction ring 300 has stops 301.

In addition, the torsional vibration damper has a catch ring 4 that is connected to the primary body 1 by projections 7 free of play. This catch ring has three catches 401 that engage with the expanding ring 30.

The expanding ring 30 and the catch ring 4 enclose cavities 8 that are tangentially delimited by a catch 401 and stop 301. The cavities 8 have a nearly square cross-section.

In the cavities 8 are cord ring rubber elements 5 whose diameter approximately corresponds to the side length of the cited square. The length of the rubber elements 5 corresponds to the arc length of the cavities 8.

As follows from FIG. 2, a cavity 8 is radially limited by a pressure device, which is realized in this embodiment by the friction ring edge 302. The friction ring 3 is able to rotate in a correspondingly shaped recess of the primary body 1. As can be seen in FIG. 1 or 5, the volume of cavity 8 is reduced upon relative rotational movement between the primary body 1 and the secondary body 2, due to the relative movement between the catches 401 and stops 301 in FIGS. 1 and 5. Since the catches 401 and 301 move towards each other, the reduction in volume essentially occurs in a tangential direction.

When the primary body 1 is rotated in reference to the secondary body 2, the rubber elements 5 initially fill the square area and increasingly act on the wall of the friction ring 3. The expanding ring 30 is spread, and the friction of the expanding ring 30 on the secondary body 2 increases, the motion of the friction ring 3 i s eased by axial slots 31 the motion of the friction ring 3 is eased by axial slots 31.

As long as the rubber element 5 has not completely filled the cavity 8, it essentially acts like a spring. When the cavity 8 is completely filled with the rubber element 5, the behavior of the rubber element 5 corresponds to the behavior of a hydraulic spring when the primary body 1 is rotated further in reference to the secondary body 2. Hence the spring constant rises substantially, and the torsional vibration damper can accept a large amount of force. In addition, the friction of the friction ring 3 on the secondary body increases so that the damping of the torsional vibration damper also rises.

Of course, by suitably selecting the shape of the cavity 8 and the shape of the rubber elements, the characteristic behavior of the torsional vibration damper can be adapted to desired requirements.

Since the length of the rubber elements 5 corresponds to the length of the cavity 8, the torsional vibration damper reacts in a suitable manner even at a low load, and the rubber elements 5 act somewhat like elastic springs.

The symmetrical arrangement of the cavities 8 or rubber elements 5 in reference to the stops 301 and the catches 401 in FIG. 1 makes the behavior of the torsional vibration damper independent of the relative rotational direction of the primary body i to the secondary body 2. Of course, by suitably selecting the rubber elements 5 or cavities 8, an asymmetrical damping characteristic can be attained.

Figure 1A:
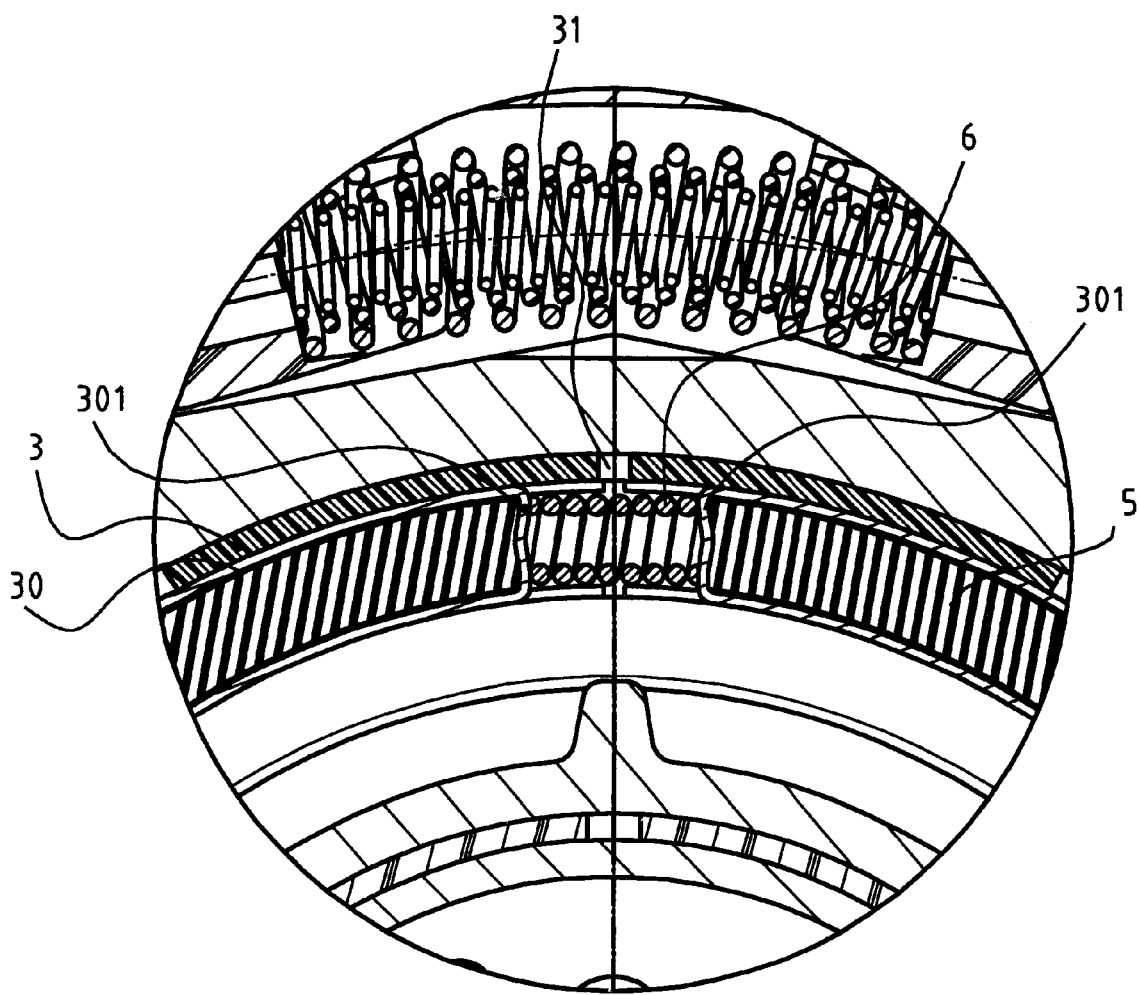
FIG. 1A is a detailed view taken from FIG. 1 showing an enlarged view of a spring element.
Figure 2:
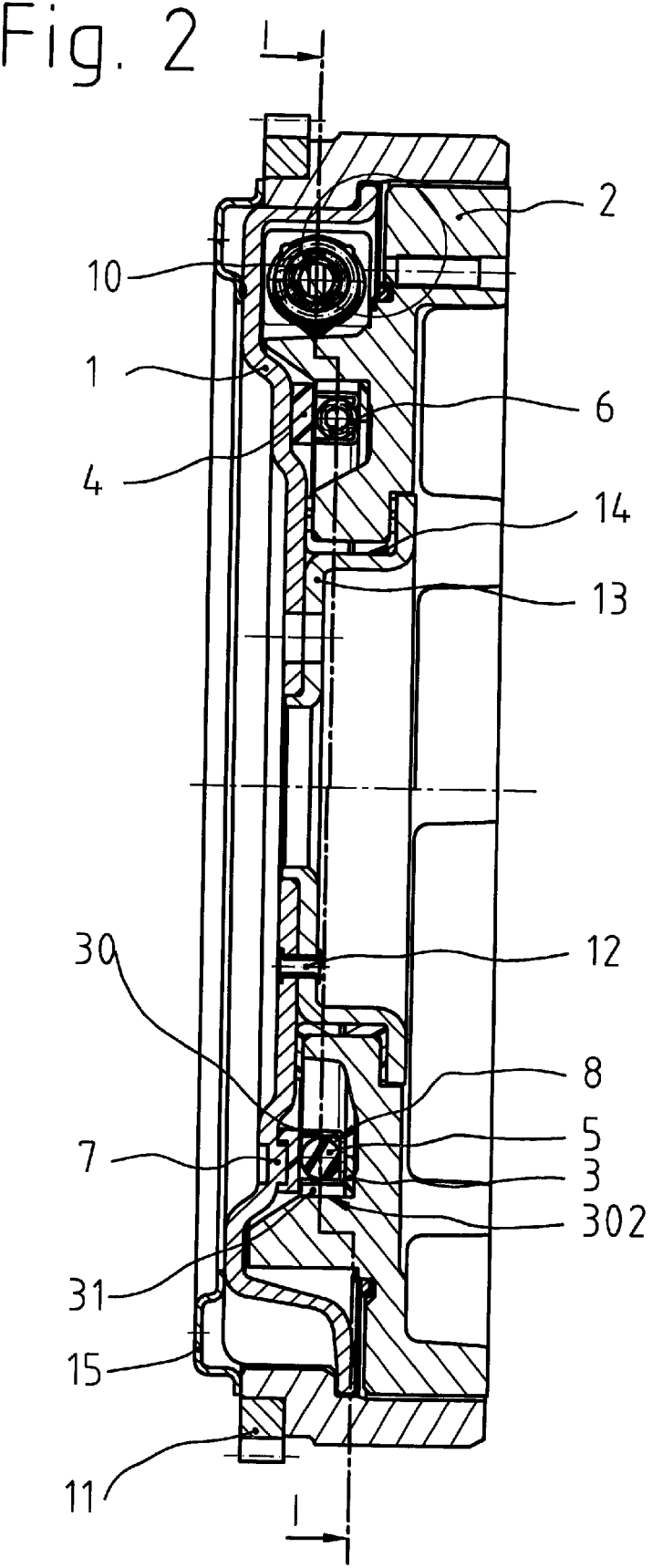
FIG. 2 is a section of the torsional vibration damper according to FIG. 1 along line II—II.
Figure 3:
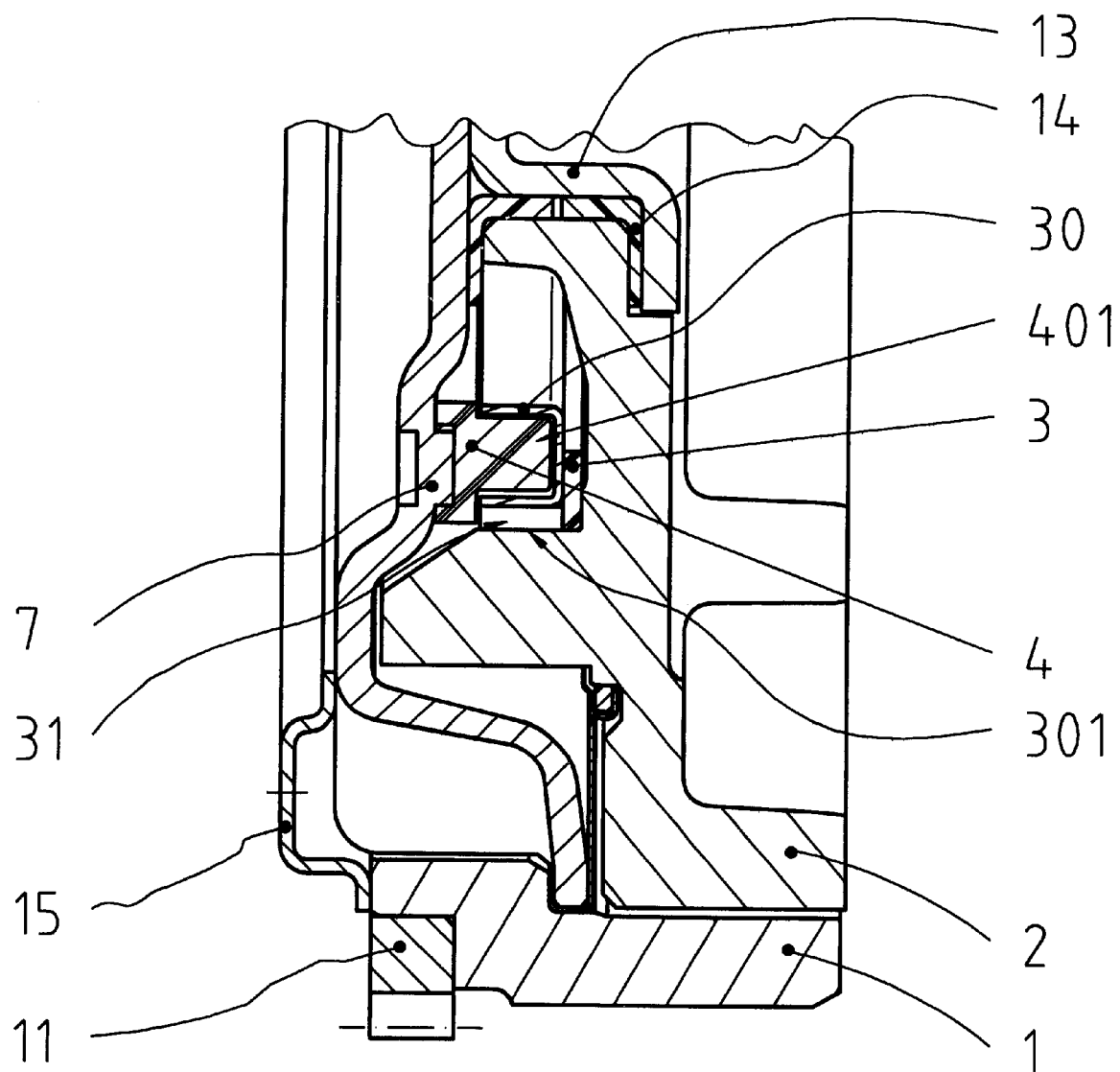
FIG. 3 is a section of the torsional vibration damper from FIG. 1 along line III—III from FIG. 1.
Figure 4:
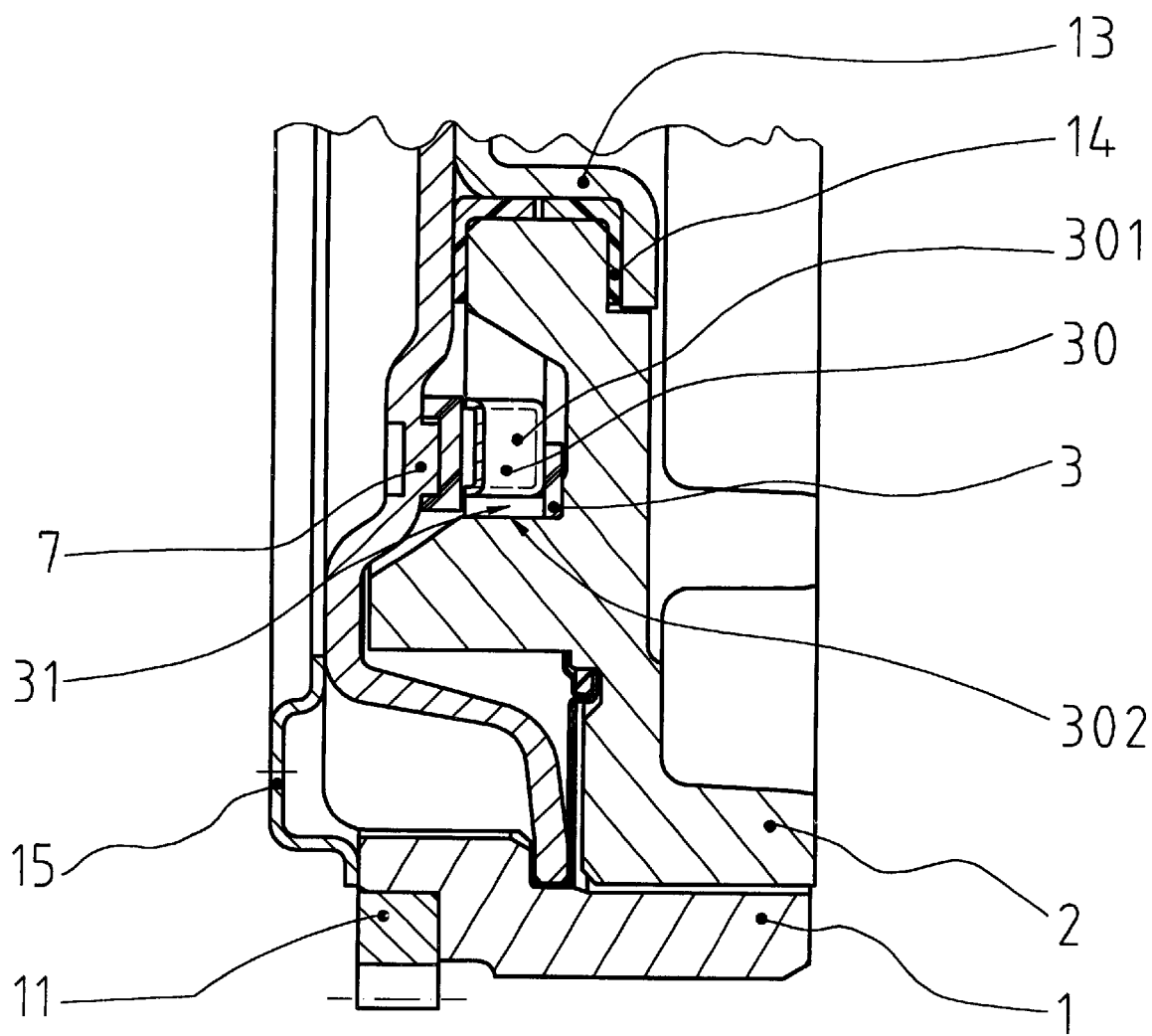
FIG. 4 is a section of the torsional vibration damper for FIG. 1 along line IV—IV from FIG. 1.

As can be seen in FIGS. 1 and 2, the expanding ring 30 is cut at one side, and a tangentially acting pretension spring 6 is inserted in this cut as also seen in FIG. 1A. This pretensions the expanding ring 30 in the friction ring 3 so that it has a specific friction resistance to the secondary body 2. At a low load, this friction resistance influences the characteristic of the torsional vibration damper together with the elastic behavior of the rubber elements 5. In contrast, the damping characteristic is influenced by the hydraulic behavior of the compressed rubber elements 5 and the resulting, strongly increased friction between the friction ring 3 and the secondary body 2 when the load is greater.

The second exemplary embodiment represents a torsional vibration damper similar to the first exemplary embodiment. With this damper, a friction ring 300 with a U-shaped cross-section that is open in an axial direction is inserted into a correspondingly shaped groove 32 of the secondary body 2, and an expanding ring is not used. The cavities 8 receiving the rubber elements 5 are formed by the friction ring 300 covered by a catch ring 4. In this embodiment, both legs of the friction ring 300 act as a friction ring edge 302 with radial surface components and are provided with axial slots 31.

In contrast to the first embodiment, the entire groove in the secondary body 2 must be extensively processed as a contact surface for the friction ring 3, and the inside of the friction ring 3 must be processed as a contact surface for the rubber element 5. Round cord sections are not used as the rubber elements 5 but rather specially-adapted rubber molded bodies. Their tangential ends are close to the cross-section of the friction ring and are provided with a radial, interior recess in their middle.

To pretension the friction ring 3 in the groove of the secondary body 2 are three radially acting pretensioning springs 6 that press the friction ring edge 302 outward at three sites distributed across the perimeter.

The functioning of this embodiment corresponds to the functioning of the first embodiment. It works free of play without free travel and exerts a small amount of force and slight damping during idling that increases to the desired maximum friction moment which can be determined by the design.

Figure 9:
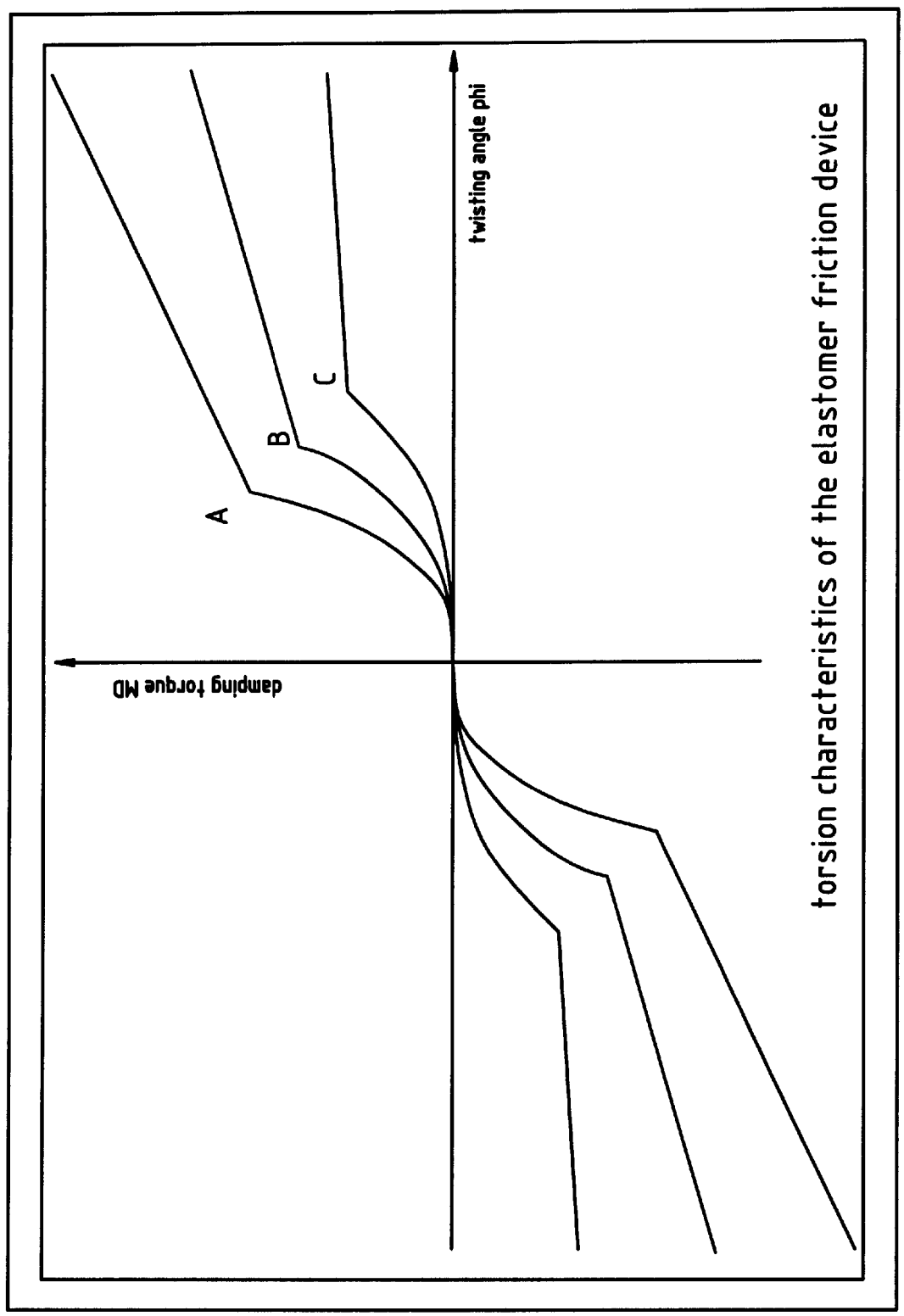

FIG. 9. Illustrates the torsion characteristics of the elastomer friction device. The rotational characteristics in FIG. 9 show different embodiments with various tensions (A: high, C: low) and different idling angles, i.e. different sizes of the radial interior recesses. Thus, curve A relates to a drag element where spring 6 exhibits high pretension and small cavity 8, while curve C relates to a drag element where there is a large cavity 8 with the spring 6 having a low pretension. Curve B relates to a drag element where the values of the pretension of spring 6 and the size of the cavity 8 are between those of A and C. Thus, curve A relates to a drag element where spring 6 exhibits high pretension and small cavity 8, while curve C relates to a drag element where there is a large cavity 8 with the spring 6 having a low pretension. Curve B relates to a drag element where the values of the pretension of spring 6 and the size of the cavity 8 are between those of A and C.

Figure 10:
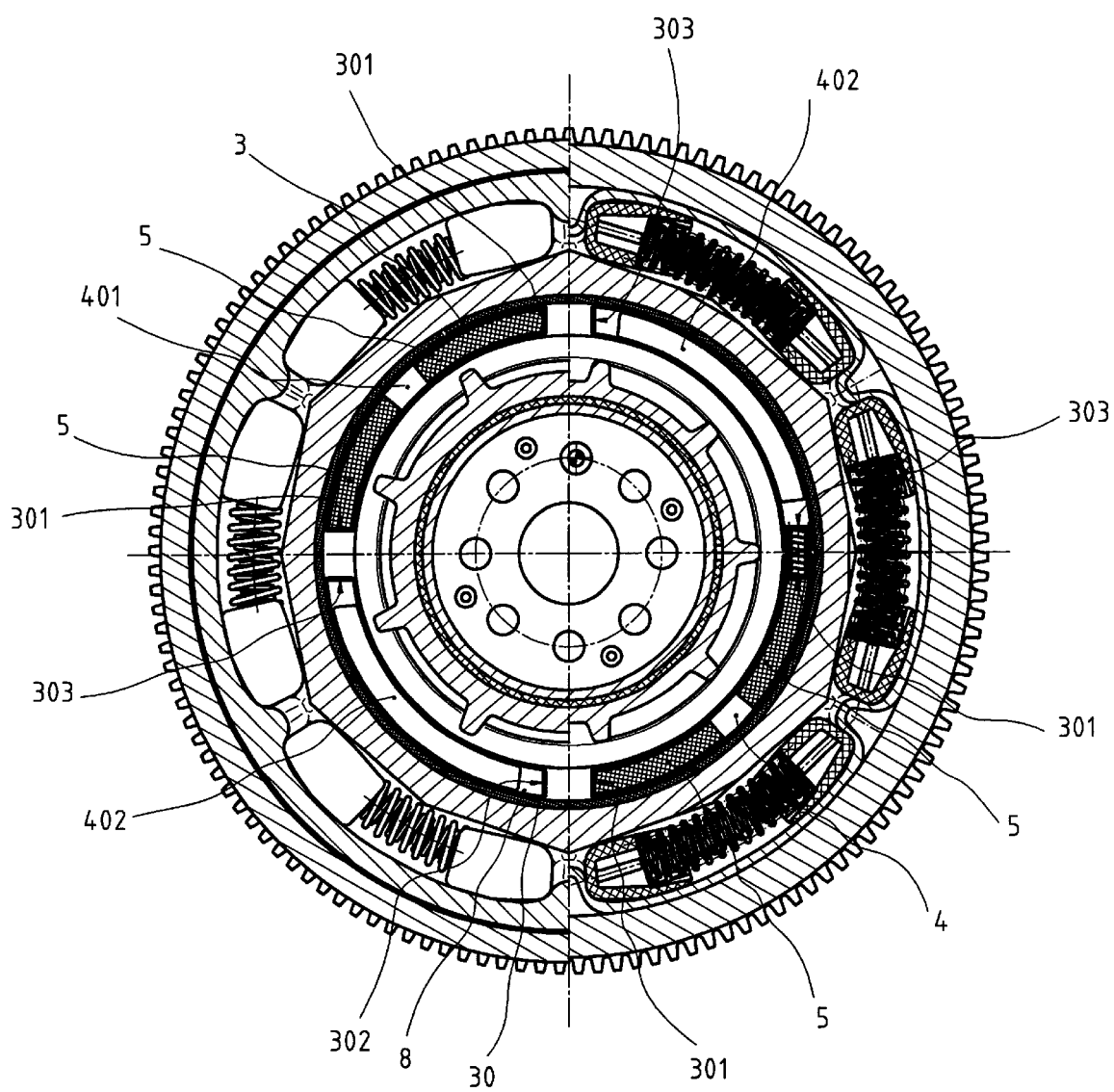
FIG. 10 is a third embodiment of a torsional vibration damper according to the invention represented similar to FIG. 1.

The third exemplary embodiment (FIGS. 10 and 11) also essentially corresponds to the first exemplary embodiment. The third exemplary embodiment has an expanding ring 30 as a drag ring, however, that has four cavities 8 in which each catch 401 and 402 engage. The catches 401 correspond to the catches of the first exemplary embodiment. On both sides of the catches 4' are rubber elements 5 which abut the catches 401 and the stops 301 of the expanding ring 30.

These catches 402 are larger than the other catches 401. There are no rubber elements on both sides of these catches 402, and the catches 402 directly contact stops 303 of the expanding ring 30 at a certain angle of rotation. The catches 402 and the stops 303 interact in an essentially non-elastic manner.

The drag ring 30 is designed in relation to the catches 401 and 402 so that the catches 402 contact stops 303 at an angle before the rubber elements 5 completely fill the cavity 8. An exemplary rotational characteristic that arises from this arrangement is shown in FIG. 11. As can be seen in the figure, there is a sudden transition at the specifically selected angle of rotation beginning at which the expanding ring 30 is entrained by the catches 402.

Of course, by suitably harmonizing the sizes of the catches 401 and 402, the rotational characteristic can be suitably selected.

In particular, it is also possible to provide rubber elements between catch 402 and stop 303 that do no completely fill the intermediate cavity.

What is claimed is:

1. A torsional vibration damper, including a primary body (1) and a secondary body (2) and comprising a drag element which comprises: at least one friction element with at least one pressure device, at least one catch, and at least one elastic element, wherein said friction element interacts with one of the primary body or the secondary body and wherein the pressure device is arranged so that a force acting on the pressure device increases the friction between the friction element and one of the primary body or the secondary body, whereby the elastic element is able to exert a force on the pressure device in dependence on the rotation between the primary and the secondary bodies; and wherein the elastic element has an elastomeric element in a cavity such that the volume of the cavity is reduced upon a relative rotational movement between the primary body (1) and the secondary body (2).

2. The torsional vibration damper according to claim 1 wherein the cavity (8) is radially delimited by the pressure device, and wherein the reduction in volume occurs substantially in a tangential direction.

3. A torsional vibration damper, according to claim 1, wherein said at least one elastic element comprises two elastic elements arranged in tangential direction, such that one elastic element is on one side of the catch and the other elastic element is on the other side of the catch, with each tangential elastic element being abutted by a tangential stop.

4. A torsional vibration according to claim 1, wherein said at least one catch comprises two tangential catches and said at least one elastic element comprises two elastic elements arranged in tangential direction, such that one elastic element is on one side of a stop, and the other elastic element on the other side of the stop with each tangential elastic element being abutted by one of said two tangential catches.

5. A torsional vibration damper according to claim 1, wherein the friction element comprises at least one friction ring.

6. A torsional vibration damper according to claim 5 wherein said friction ring has an essentially L-shaped cross-section with a radial, outside leg, whereby at least the radial, outside surface of this leg serves as a friction surface.

7. A torsional vibration damper according to claim 6, wherein the friction ring rotates under friction in a correspondingly shaped recess of one of the primary body or the secondary body.

8. A torsional vibration damper according to claim 6 wherein said friction surface has a radial surface component formed with axial slots (31).

9. A torsional vibration damper according to claim 5, wherein the friction ring (3) has an essentially U-shaped cross-section that is open in an axial direction, and at least a radial, outward surface of the friction ring (3) serves as a friction surface.

10. A torsional vibration damper according to claim 9 wherein the friction surface with a radial surface component is formed with axial slots (31).

11. A torsional vibration damper according to claim 1, wherein the friction element has at least one frictional surface with a radial surface component.

12. A torsional vibration damper according to claim 11 wherein the friction surface with a radial surface component is formed with axial slots (31).

13. A torsional vibration damper including a primary body (1) and a secondary body (2); comprising a drag element which comprises: at least one friction element with at least one pressure device, at least one catch, and at least one elastic element, wherein said friction element interacts with one of the primary body or the secondary body and wherein the pressure device is arranged so that a force acting on the pressure device increases the friction between the friction element and one of the primary body or the secondary body, whereby the elastic element is able to exert a force on the pressure device in dependence on the rotation between the primary and the secondary bodies; wherein the elastic element has an elastomeric element in a cavity; and wherein the cavity (8) is radially delimited by the pressure device, and wherein the cavity (8) is radially delimited by the pressure device, and wherein a reduction in volume occurs substantially in a tangential direction.

14. A torsional vibration damper, according to claim 13, wherein said at least one elastic element comprises two elastic elements and in tangential direction one elastic element is arranged is on each side of the catch, with each tangential elastic element being abutted by a tangential stop.

15. A torsional vibration according to claim 13, wherein said at least one catch comprises two tangential catches and said at least one elastic element comprises two elastic elements and in tangential direction one elastic element is arranged on each side of a stop, with each tangential elastic element being abutted by one of said two tangential catch.

16. A torsional vibration damper according to claim 13, wherein the friction element comprises at least one friction ring.

17. A torsional vibration damper according to claim 16 wherein said friction ring has an essentially L-shaped cross-section with a radial, outside leg, whereby at least the radial, outside surface of this leg serves as a friction surface.

18. A torsional vibration damper according to claim 17, wherein the friction ring rotates under friction in a correspondingly shaped recess of one of the primary body or the secondary body.

19. A torsional vibration damper according to claim 17, wherein said friction surface has a radial surface component formed with axial slots (31).

20. A torsional vibration damper according to claim 16, wherein the friction ring (3) has an essentially U-shaped cross-section that is open in an axial direction, and at least a radial, outward surface of the friction ring (3) serves as a friction surface.

21. A torsional vibration damper according to claim 20, wherein the friction surface with a radial surface component is formed with axial slots (31).

22. A torsional vibration damper according to claim 13, wherein the friction element has at least one frictional surface with a radial surface component.

* * * * *